United States Patent [19]

Mogami et al.

[11] Patent Number: 4,558,430
[45] Date of Patent: Dec. 10, 1985

[54] CONTROLLER OF DIGITAL CONTROL SYSTEM AND METHOD FOR CONTROLLING THE SAME

[75] Inventors: Takeo Mogami, Fujisawa; Michio Saeki, Yokohama, both of Japan

[73] Assignee: Yamatake-Honeywell Co., Ltd., Tokyo, Japan

[21] Appl. No.: 432,970

[22] Filed: Oct. 5, 1982

[30] Foreign Application Priority Data

Oct. 5, 1981 [JP] Japan .......................... 56-148471[U]

[51] Int. Cl.[4] ...................... G06F 15/46; G05B 13/02
[52] U.S. Cl. ..................................... 364/900; 364/162
[58] Field of Search ............... 364/153, 200 MS File, 364/900 MS File, 162, 177

[56] References Cited

U.S. PATENT DOCUMENTS

| | | | |
|---|---|---|---|
| 3,786,242 | 1/1974 | Brooks | 364/162 X |
| 4,232,364 | 11/1980 | Bibbero | 364/162 X |
| 4,279,013 | 7/1981 | Cameron et al. | 364/153 |
| 4,346,433 | 8/1982 | Rutledge | 364/162 |
| 4,430,698 | 2/1984 | Harris | 364/162 |
| 4,451,878 | 5/1984 | Shigemasa | 364/157 X |

*Primary Examiner*—Thomas M. Heckler
*Attorney, Agent, or Firm*—Blakely, Sokoloff, Taylor & Zafman

[57] ABSTRACT

A plurality of proportional plus integral plus derivative ("PID") parameters are prestored in a memory device and at the leading points of respective time segments of a program pattern, PID parameters adequate for the time segment are read out and PID control actions are made by utilizing read out parameters for effecting a process control.

2 Claims, 6 Drawing Figures

CONTROLLER OF DIGITAL CONTROL SYSTEM AND METHOD FOR CONTROLLING THE SAME

BACKGROUND OF THE INVENTION

This invention relates to a controller of a digital control system containing a program transmitter and a method for controlling the same.

In recent years, when automatically process controlling the temperature in a furnace utilized in heat treatment in a chemical factory, a program transmitter is used which outputs desired set point variables corresponding to respective times in accordance with a prestored program pattern, and the set point variables are processed by a digital arithmetic operation together with process variables, thus performing controls.

The process acting as the controlled system is generally a system having a high order log and a time delayed response resulting in useless time in the control. For this reason, in order to effect the control at a sufficiently high response speed while preventing departure from a stable condition, a control based only on a proportional action is not sufficient. Accordingly, a proportional plus integral plus derivative ("PID") action in which integral action and a derivative action are added to the proportional action has been used. In this case, PID parameters, i.e. proportional band (PB) or proportional gain, reset time (TI), and derivative time (TD) or rate time, are determined in accordance with respective processes, and the controls are made in accordance with the parameters.

However, in a process, the control actions of the process vary as time elapses at respective processing steps (hereinafter termed time segments) during the process in accordance with the magnitude of the set point variable, for example the level of the temperature or the characteristics of the treated objects. In the case of controlling furnace temperature, the control actions are not the same where the temperature to be controlled is relatively low or high.

With the prior art controller, only one set of PID parameters was set for one process. Although a prior art controller performed a satisfactory control action based on a PID suitable for a given segment, that control action and PID was not always satisfactory for other segments. As a consequence, it has been difficult to ensure adequate and accurate controls throughout the process.

SUMMARY OF THE INVENTION

Accordingly, it is an object of this invention to provide an improved controller of a digital control system and a method for controlling the same capable of performing an accurate and adequate control throughout the entire process in which the control actions are different at respective segments of the process.

Briefly stated, this object can be accomplished by this invention by prestoring a plurality of PID parameters in a memory device, and at the leading points of respective time segments of the program pattern, the PID parameters adequate for the time segments are read out, and the PID control actions are made by utilizing the read out parameters for effecting a process control.

According to one aspect of the invention, there is provided a controller of a digital control system comprising a first memory device for storing a program that instructs a control of a program, a second memory device for storing a program pattern consisting of a plurality of continuous time segments whose set point variables correspond to the time segments, a third memory device for storing a plurality of PID parameters, a timer for measuring the elapsed time for each time segment, and arithmetic operation means operating according to the program, the arithmetic operation means measuring a process variable, reading out a set point variable corresponding to the time segment at a measuring point from the second memory device, determining the deviation between the measured process variable and the read out set point variable to calculate error data, reading out a PID parameter optimum for a time segment determined by the timer at the measuring point from the third memory device for performing a PID control calculation based on the read out PID parameter and the error data so as to produce a manipulated variable for varying the process variable in accordance with a result of the calculation, thereby controlling the process variable in accordance with the set point variable.

According to another aspect of the present invention there is provided a method for controlling a digital control system comprising the steps of storing in a first memory device a program that instructs a control of a program, storing a program pattern consisting of a plurality of continuous time segments whose set point variables values are determined with time, storing a plurality of PID parameters in a third memory device, measuring the elapsed time for each time segment with a timer, providing an arithmetic operation means operating in accordance with the program, measuring a process variable, reading out a set point variable corresponding to the time segment at a measuring point from the second memory device, determining the deviation between the measured process variable and the read out set point variable to calculate an error data, reading out a PID parameter optimum for a time segment determined by the elapsed time at the measuring point from the third memory device for performing a PID control calculation based on the read out PID parameter and the error data so as to produce a manipulated value for varying the process variable in accordance with a result of the calculation, thereby controlling the process variable in accordance with the set point variable.

DESCRIPTION OF THE PREFERRED EMBODIMENT

Figure 1:
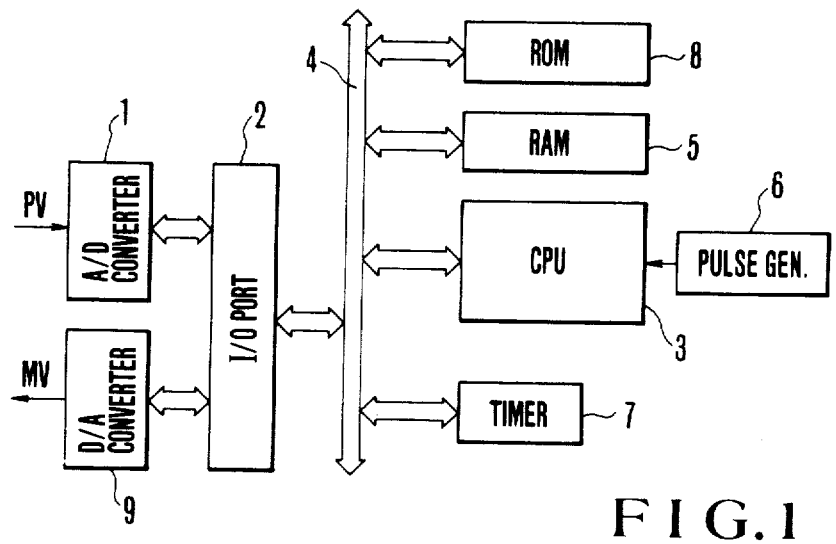
FIG. 1 is a block diagram showing one embodiment of the controller according to this invention.

The controller shown in FIG. 1 comprises an A/D converter 1 which converts analog signals of the measured temperature of a furnace, that is process variables (hereinafter called PV values) or the controlled values into digital signals at each sampling time for supplying the digital signals to an input and output (I/O) port 2. The PV value data inputted to the I/O port 2 are stored in a random access memory (RAM) 5 via a bus line 4 in accordance with an instruction from a central processing unit (CPU) 3. The CPU 3 operates as an arithmetic operation device and comprises an element such as No. 8085 sold by Intel Corp. including an arithmetic logic unit (ALU), a control logic, a plurality of registers, etc. The CPU 3 is controlled by clock signals supplied from a pulse generator circuit 6 made up of a quartz oscillator. The clock signals are used as a reference signal of a timer 7 which produces a time measuring data for determining the time intervals for each segment. A read only memory (ROM) 8 stores a program for controlling the process and the control is performed by an instruction from CPU 3 according to the program. Another digital-/analog (D/A) converter 9 is supplied with the result of arithmetic operation via the I/O port 2 for converting digital signals into analog signals, i.e., the manipulated values MV. Thus, the furnace temperature PV is adjusted by the manipulated value MV.

Figure 2:
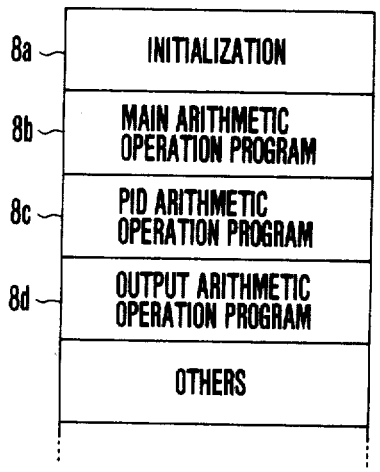
FIG. 2 shows a memory map of a ROM.
Figure 3:
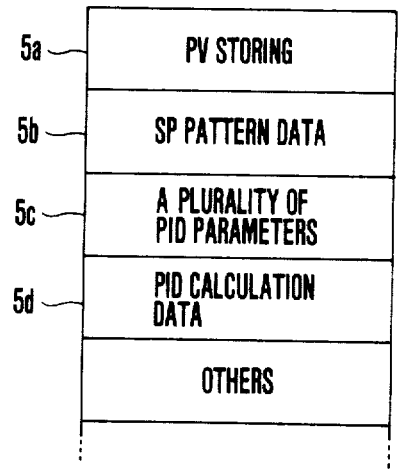
FIG. 3 shows a memory map of a RAM.

The ROM 8 and RAM 5 are constructed to have a plurality of memory areas as shown in FIGS. 2 and 3 respectively. More particularly the ROM 8 is assigned with an area 8a for initialization, and areas 8b to 8d for storing instructions for executing respective steps necessary for performing a program, whereas the RAM 5 is assigned with areas 5a to 5d storing various data necessary for executing the program. Area 5b prestores various data regarding a program pattern as shown in FIG. 4, while area 5c prestores a plurality of PID parameters optimum for respective time segments.

Figure 4:
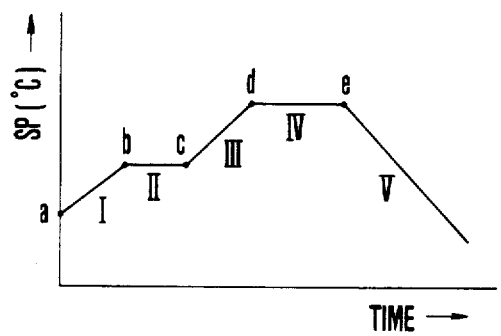
FIG. 4 shows a program pattern of a SP value.

The program pattern shown in FIG. 4 comprises time segments I, II, III, IV and V continuously arranged with time t, wherein a, b, c, d and e shows leading or starting points of respective segments. I, III and V are ramp segments in which set values (temperatures) vary with time at a constant slope, while II and IV are soak segments in which the set values (temperatures) are held at constant values for definite intervals. Consequently, area 5b stores time data and a set point variable (hereinafter called a SP value) data corresponding thereto.

Figure 5:
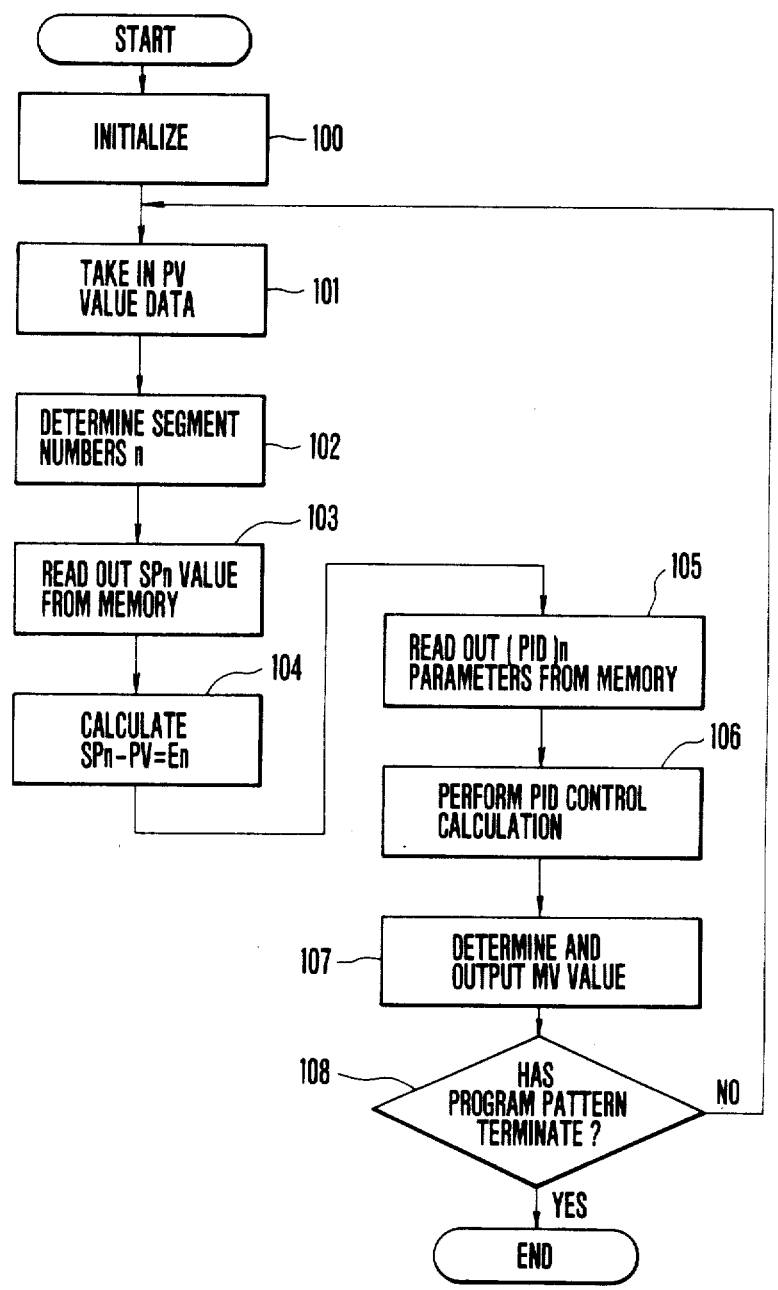
FIG. 5 is a flow chart useful to explain the operation of the control system embodying the invention.

The control action of the controller of this invention will now be described with reference to a flow chart shown in FIG. 5.

As the CPU 3 starts to operate, the control is executed according to the program stored in the ROM 8. At step 100, the CPU 3 accesses area 8a to perform routine initialization, including CPU self-examining procedures.

Then the CPU 3 accesses area 8b to execute the main arithmetic operation program. Thus at step 101 the PV value data is taken in from the A/D converter 1 according to a sampling instruction and stored in the area 5a of RAM 5. Then, at step 102, timer 7 measures the time intervals for each segment and determines the segment numbers n (I, II. . . ) for each segment of the program pattern. Of course the first segment number is I. At step 103 a SPn value corresponding to the time segment is read out from the area 5b of RAM 5, and at step 104 a subtraction operation (SPn−PV) is executed between the SPn value data and the PV value data stored in the area 5a. The error data En obtained by the subtraction operation is stored in the area 5d of RAM 5 as PID calculation data. Then, at step 105, parameters PBn, TIn and TDn corresponding to the segment numbers n are read out from the area 5c of RAM 5 and stored in the area 5d as PID calculation data. Then by reading out a subroutine of the main arithmetic operation program stored in the area 8b, an access is made to the area 8c to execute the PID calculation program stored therein.

Accordingly, PID calculation data En, PBn, TIn and TDn are read out from the area 5d of RAM 5. At step 106, a PID control calculation is made based on these data. The formulas for PID control calculations are well known to those skilled in the art.

In the same manner, by reading out the subroutine, the area 8d is accessed to execute an output calculation program stored therein. Then, at step 107, manipulated value MV is determined based on the result of the PID control calculation. The MV value is converted into an analog signal from a digital signal by the D/A converter 9 via the I/O port 2 and the analog signal thus converted is supplied to the actuator. As a consequence, a control action is made so as to eliminate the error data En so that the PV value is corrected to follow up the SPn value.

Then at step 108, when it is judged that the time interval has not reached the end point of the program pattern, the program returns to step 101. The control actions described above are repeated at each sampling period.

In an interval in which the counting data reaches from the leading point a to the leading point b shown in FIG. 4, that is in the zone of segment I, the SP data value which gradually increases with the increase of the counting data is read out from the area 5b at each sampling period, and in this period parameters PB1, TI1 and TD1 which are constant in this zone are also read out from the area 5c. When the time interval reaches the leading point b, it is judged that the segment number has changed to II. When the zone of segment II is reached the SP value data, which is constant irrespective of the counting data, is read out from the area 5b at each sampling period. Further, in this zone parameters P2, I2 and D2 which are constant are read out from the area 5c. In the same manner, as the counting data increases, the segments III, IV and V are controlled. Upon reaching the end point of the program pattern, the result of judgement at step 108 is YES to terminate the program.

As above described, at each segment of the program pattern, a PID parameter optimum for the control action of that segment is read out and a PID control calculation is made so that a satisfactory control can be made throughout the process.

Figure 6:
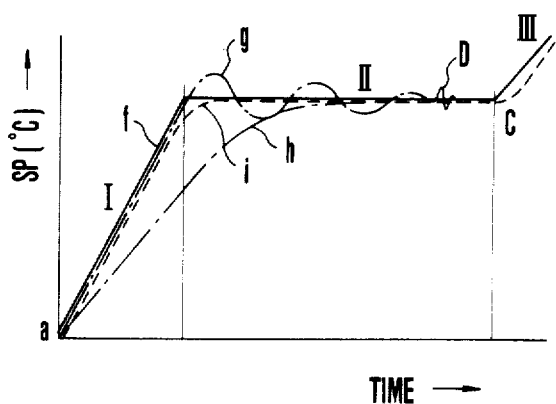
FIG. 6 shows operating characteristics.

FIG. 6 are characteristics showing the manner of varying the control action according to the PID parameter, in which a solid line f shows the variation of the SP value according to the program pattern, and comprises segments I and II (segments III–V are not shown).

In the zone of segment I, the temperature is raised from normal temperature to a predetermined high temperature. When the temperature rises rapidly in this manner not to damage the furnace and substances heat treated therein, the efficiency of the furnace is improved. In the zone of segment II, the temperature is maintained at a predetermined high constant temperature. Upon occurrence of an external disturbance as shown by D, for example, a control action is necessary to eliminate such disturbance.

Dot and dash lines g shows a PV value characteristic obtained by effecting a control by PID parameters (PB1, TI1, TD1) optimum for the control of the zone of the segment I. In this case, since the building up is sharp, a large overshoot results when the zone is switched to that of segment II so as to obtain a flat control action for that zone.

Another dot and dash line h shows the characteristic of the PV value obtained by controlling with PID parameters (PB2, TI2, TD2) optimum for the control of segment II. In this case, as it is necessary to maintain flat the PV value in the zone of segment II, the build up time becomes long and the PV value remains apart from the SP value.

In contrast, since the PID control calculations are performed by using parameters PB1, TI1 and TD1 in the zone of segment I and by using parameters PB2, TI2 and TD2 in the zone of segment II, as shown by dotted lines i, the characteristic of the PV value follows up in coincidence with the SP value.

The PID parameters stored for each segment are the optimum set for each segment. It is also possible to independently store PB, TI and TD and read them out by designating PB, TI or TD for the segment.

As above described, according to the invention, it is possible to use an optimum PID parameter for a specific segment of a program pattern so that it is possible to perform an adequate and highly accurate control throughout the process.

What is claimed is:

1. A controller of a digital control system comprising:
    a first memory device for storing a program,
    a second memory device for storing a program pattern consisting of a plurality of continuous time segments whose set point variables correspond to the time segments,
    a third memory device for storing a plurality of PID parameters;
    a timer for measuring elapsed time for each time segment; and
    arithmetic operation means operating according to said program, said arithmetic operation means measuring a process variable, means for reading out a set point variable corresponding to said time segment at a measuring point from said second memory device, means for determining the deviation between the measured process variable and said read out set point variable to calculate error data, means for reading out a PID parameter corresponding to a time segment at said measuring point from said third memory device for performing a PID control calculation based on said read out PID parameter and said error data so as to produce a manipulated value for varying said process variable in accordance with a result of said calculation, thereby controlling said process variable in accordance with said set point variable.

2. A method for controlling a digital control system comprising the steps of:
    storing in a first memory device a program;
    storing a program pattern consisting of a plurality of continuous time segments whose set point variables correspond to the time segments;
    storing a plurality of PID parameters in a third memory device;
    measuring elapsed time for each time segment;
    providing an arithmetic operation means operating in accordance with the program;
    measuring a process variable;
    reading out a set point variable corresponding to a time segment at a measuring point from the second memory device;
    determining the difference between the measured process variable and the read out set point variable to calculate error data; and
    reading out a PID parameter corresponding to a time segment at the measuring point from the third memory device for performing a PID control calculation based on the read out PID parameter and the error data so as to produce a manipulated value for varying the process variable in accordance with a result of the calculation, thereby controlling the process variable in accordance with the set point variable.

* * * * *

UNITED STATES PATENT AND TRADEMARK OFFICE
CERTIFICATE OF CORRECTION

PATENT NO. : 4,558,430
DATED : December 10, 1985
INVENTOR(S) : Mogami et al.

It is certified that error appears in the above-identified patent and that said Letters Patent is hereby corrected as shown below:

| COLUMN | LINE | DESCRIPTION |
|---|---|---|
| 1 | 18 | Delete "log" and insert --lag--. |
| 4 | 30 | Delete "b" and insert --$\underline{b}$--. |
| 4 | 47 | Delete "f" and insert --$\underline{f}$--. |
| 4 | 60 | Delete "g" and insert --$\underline{g}$--. |
| 4 | 67 | Delete "h" and insert --$\underline{h}$--. |
| 5 | 10 | Delete "i" and insert --$\underline{i}$--. |

Signed and Sealed this

Nineteenth Day of January, 1988

*Attest:*

DONALD J. QUIGG

*Attesting Officer*          *Commissioner of Patents and Trademarks*